No. 743,849. PATENTED NOV. 10, 1903.
H. W. FISHER.
LUBRICATOR.
APPLICATION FILED SEPT. 26, 1903.
NO MODEL.
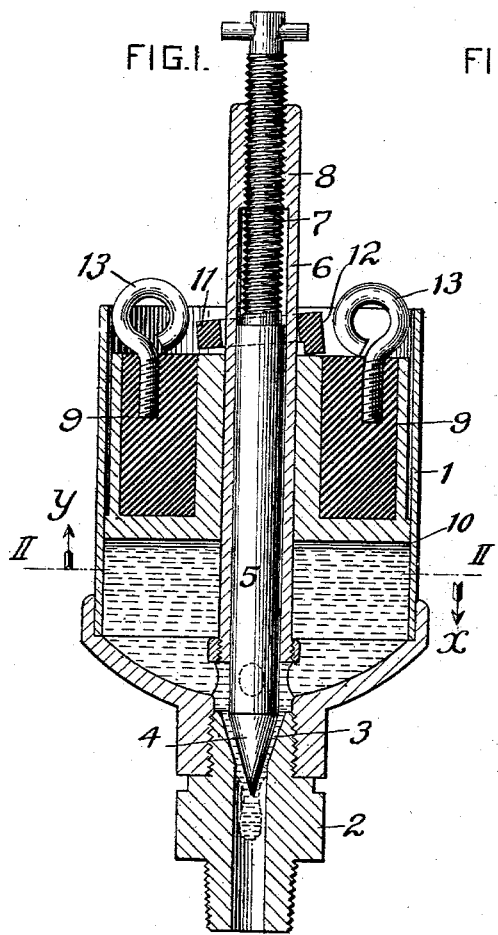
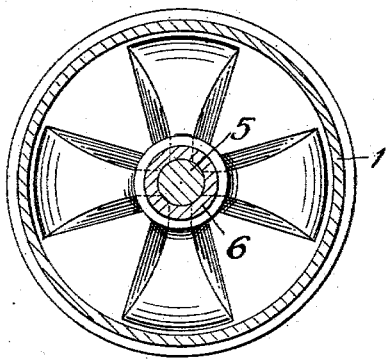
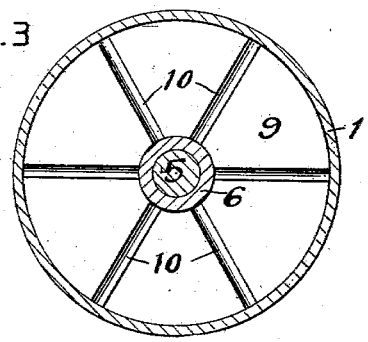
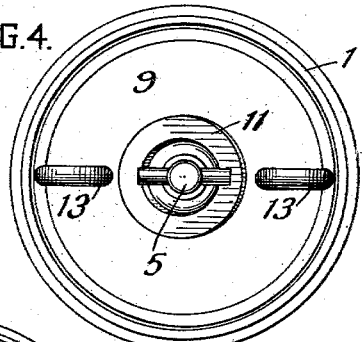
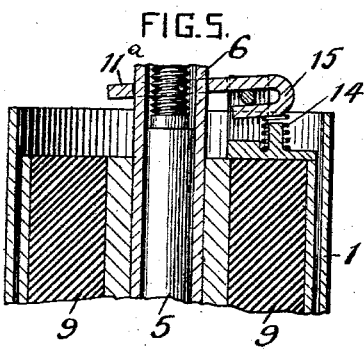
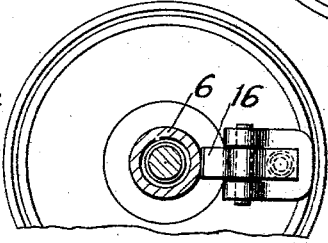
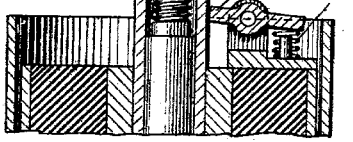
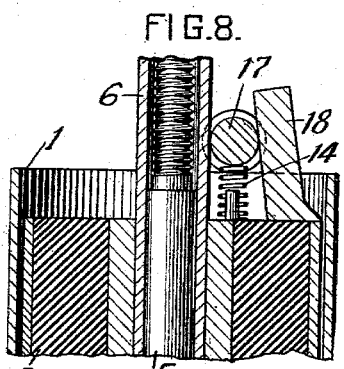
WITNESSES:
INVENTOR
Henry W. Fisher
by Christy & Christy
Att'ys.

No. 743,849.  
Patented November 10, 1903.

UNITED STATES PATENT OFFICE.

HENRY W. FISHER, OF PITTSBURG, PENNSYLVANIA, ASSIGNOR OF ONE-HALF TO GRANT McCARGO, OF PITTSBURG, PENNSYLVANIA.

LUBRICATOR.

SPECIFICATION forming part of Letters Patent No. 743,849, dated November 10, 1903.

Application filed September 26, 1903. Serial No. 174,749. (No model.)

*To all whom it may concern:*

Be it known that I, HENRY W. FISHER, a citizen of the United States, residing at Pittsburg, in the county of Allegheny and State of Pennsylvania, have invented or discovered certain new and useful Improvements in Lubricators, of which improvements the following is a specification.

The invention described in this case, which is a continuation of application Serial No. 144,390, filed February 21, 1903, relates to certain improvements in devices for feeding lubricants of a viscous character, such as grease, and has for its object a construction whereby the lubricant is subjected to a constant uniform pressure, thereby insuring complete regularity of feed.

The invention is hereinafter more fully described and claimed.

In the accompanying drawings, forming a part of this specification, Figure 1 is a sectional elevation of my improvement. Figs. 2 and 3 are sectional views on a plane indicated by the line II II, Fig. 1, looking in the direction of the arrows $x$ and $y$, respectively. Fig. 4 is a top plan view. Fig. 5 is a section of a portion of the lubricator, illustrating a modification of the clutch mechanism. Fig. 6 is a top plan, and Fig. 7 a sectional elevation, of a further modification of the clutch; and Fig. 8 is a sectional elevation showing a fourth form of clutch.

In the practice of my invention I employ an open-top cup or cylinder 1, provided at its lower end with a threaded nipple 2, whereby the cup may be secured in position to lubricate the desired part. In this nipple is formed a seat 3 for the valve 4, preferably made in the form of a cone on the lower end of a rod 5, which extends down through a guide-tube 6, suitably supported centrally of the cup. This rod is provided with a threaded portion 7 engaging a threaded portion 8 of the tube 6. This construction permits of the adjustment of the valve toward and from its seat, thereby regulating the passage of grease from the cup through the nipple. The bottom of the cup is preferably provided with radial grooves, the bottom being inclined, said grooves terminating in openings through the wall of the central passage formed in part by the tube 6, so as to permit of the free passage of the grease from the cup into the nipple. A weight 9 of a shape and external dimension to closely fit within the cup or cylinder and move freely up and down is employed for exerting a constant and uniform pressure upon the surface of the grease. The weight is also formed with a central passage for the central tube 6 and forms a close joint therewith. In order to facilitate the escape of air which may be caught between the weight and the surface of the grease, it is preferred to form radial grooves 10 in the under side of the weight, said grooves extending to the edge of the weight, so that any air may escape between the weight and the cup, thus preventing the formation of an elastic cushion between the cup and weight, tending to vary or change the desired uniformity of action of the weight. As the weight fills sufficiently tight within the cup to prevent the passage of lubricant beyond it, no cap or cover is required to prevent the escape of lubricant, such function being performed by the weight. As the lubricant used in this style of lubricators is only plastic and not fluid, the weight should be comparatively long, so that it may be heavy enough to cause a flow of the lubricant. Sufficient length of weight to attain the desired end can be had easily without lessening the capacity of the cup, as the weight may extend nearly its entire length above the cup when the latter is filled. When the weight projects above the cup, it is guided by the central guide 6.

In order to prevent any jerking or jumping of the weight when the cup is applied to a moving part, as to a crank-pin, I employ a suitable checking mechanism which will not interfere in any way with the free inward movement of the weight, but will prevent any jumping or outward movement thereof. A desirable construction to this end consists of a ring 11, slightly larger than the central tube 6 and provided on its under side and at one side of the center with an enlargement or lug 12, adapted to hold the ring in an inclined position, so as to lightly bite upon the tube. As the weight drops, this ring will slide down therewith; but as soon as the weight moves outwardly the ring will be tipped to a sharper angle and caused to bite against the tube, thereby preventing any further outward movement of the weight. The clutch mechanism should be so constructed as to prevent any return movement of the weight. In other words, a pawl-and-ratchet construction is undesirable, as the pawl will engage the teeth only after certain predetermined movements of the weight, and hence when the weight moves a less distance an up-and-down play of the weight will occur. Hence a friction clutch mechanism which will take a new grip on the slightest movement of the weight is preferred. It is preferred to provide lifting-rings 13 for the weight to facilitate its removal from the cup when additional grease has to be placed in the cup.

In order to insure the grip of the clutch on the rod or tube 6, a spring 14 may be arranged under the outer end of the stem 15 of the ring 11ª, which may be pivotally mounted, as shown in Fig. 5.

As shown in Figs. 6 and 7, the clutch may be made in the form of a finger 16, pivotally mounted and so arranged that its inner end will bear tightly or take a grip on the rod or tube 6 when the weight tends to move outwardly. The inner end of the finger is yieldingly held against the rod by a spring 14, so as to take instant grip on the rod on any tendency of the weight to move outwardly.

In Fig. 8 is shown another form of grip, consisting of a concave cylinder 17, arranged between the tube or rod 6 and an inclined post 18. The cylinder is made of a diameter greater than the shortest distance between the rod and post and is yieldingly held in contact with both by a spring 14. The several parts are so arranged as to permit of the inward movement of the weight; but in case the latter tends to move outward the cylinder or movable member will become jammed between the rod and post and prevent any outward movement of the weight.

I claim herein as my invention—

1. A feed device for lubricants having in combination a cup or cylinder having an outlet, a rod arranged with the cup, a movable annular weight arranged to exert a constant and uniform feed-pressure on the lubricant and a ring-clutch operative to prevent any outward movement of the weight, substantially as set forth.

2. A feed device for lubricants having in combination a cup or cylinder provided with a hollow nipple, a tube arranged in the cup in line with the nipple, a rod provided with a valve arranged in said tube, a movable annular weight arranged to exert a constant and uniform feed-pressure on the lubricant, and a ring-clutch adapted to engage the tube on an outward movement of the weight, substantially as set forth.

3. A feed device for lubricants having in combination a cup or cylinder, having an outlet, a guide-rod arranged within the cup, a movable annular weight arranged to exert a constant and uniform feed-pressure on the lubricant, and a friction-check operative to prevent any outward movement of the weight, substantially as set forth.

4. A feed device for lubricants having in combination an open-topped cup or cylinder, having an outlet, a guide-rod extending from the closed end of the cup, and a movable annular weight fitting within the cup and around the guide-rod, substantially as set forth.

5. A feed device for lubricants having in combination an open-topped cup or cylinder, having an outlet, a tube within the cup in line with the outlet, a valve controlling the flow of lubricant from the cup, a valve-rod extending through the tube and a movable annular weight fitting within the cup and around the tube and exerting a constant and uniform feed-pressure on the lubricant, substantially as set forth.

6. A feed device for lubricants having in combination an open-topped cup or cylinder having an outlet, a guide-rod having its inner end secured within the cup, a movable annular weight fitting within the cup and around the rod and exerting a constant and uniform pressure on the lubricant, and means for preventing any outward movement of the weight, substantially as set forth.

In testimony whereof I have hereunto set my hand.

HENRY W. FISHER.

Witnesses:
 DARWIN S. WOLCOTT,
 F. E. GAITHER.